United States Patent

Zimmer

[11] Patent Number: 5,624,364
[45] Date of Patent: Apr. 29, 1997

[54] TOOL CHANGE DEVICE FOR MANIPULATORS

[75] Inventor: Ernst Zimmer, Friedberg, Germany

[73] Assignee: Kuka Schweissanlagen & Roboter GmbH, Augsburg, Germany

[21] Appl. No.: 617,819

[22] PCT Filed: Sep. 2, 1994

[86] PCT No.: PCT/EP94/02916

§ 371 Date: Feb. 28, 1996

§ 102(e) Date: Feb. 28, 1996

[87] PCT Pub. No.: WO95/07168

PCT Pub. Date: Mar. 16, 1995

[30] Foreign Application Priority Data

Sep. 4, 1993 [DE] Germany .................. 9313310 U

[51] Int. Cl.$^6$ .................. B23Q 3/155; F16L 39/04
[52] U.S. Cl. .................. 483/16; 285/136; 414/4; 483/901; 901/41
[58] Field of Search .................. 483/13, 16, 31, 483/901, 902, 69; 901/41, 43, 42, 29, 50; 414/4; 285/136, 133.1

[56] References Cited

U.S. PATENT DOCUMENTS

| | | | |
|---|---|---|---|
| 4,611,377 | 9/1986 | McCormick et al. | 483/901 X |
| 4,683,912 | 8/1987 | Dubrosky | 285/136 X |
| 4,767,257 | 8/1988 | Kato | 901/50 X |
| 4,809,747 | 3/1989 | Choly et al. | 901/42 X |
| 5,199,748 | 4/1993 | Jung et al. | 285/136 |
| 5,205,701 | 4/1993 | Kigami et al. | 483/901 X |

FOREIGN PATENT DOCUMENTS 2596495  8/1988  France .................. 285/136

*Primary Examiner*—William R. Briggs
*Attorney, Agent, or Firm*—McGlew and Tuttle

[57] ABSTRACT

A tool change device for manipulators, which have a rotary connection for fluidic supply lines of the tool. The rotary connection comprises a fixed part and a rotary part, whose contact plane is directed at right angles to the power take-off axis of rotation of the manipulator. The rotary and fixed parts have ring channels, which are arranged in concentric circles around the power take-off axis of rotation and open into cross channels. The rotary and fixed parts are flatly in contact with one another and are held together in the housing of the manipulator-side coupling part along the power take-off axis of rotation in an adjustable tensioning connection.

6 Claims, 3 Drawing Sheets

TOOL CHANGE DEVICE FOR MANIPULATORS

FIELD OF THE INVENTION

The present invention pertains to a tool change device for manipulators, which has a rotary connection for fluidic supply lines of the tool and more particularly to a tool change device for manipulators with a rotary connection which has a fixed part and a rotary part with ring channels and cross channels.

BACKGROUND OF THE INVENTION

Such a tool change device has been known from EP-B10 288 744. A rotary connection for fluidic supply lines of the tool, which has a fixed part with ring channels and a rotary part with cross channels, is present in the tool change device. The ring channels are arranged at the inner circumference of the fixed part and are positioned one behind the other in the direction of the power take-off axis of rotation of the manipulator. During the assembly of the rotary connection, the fixed part and the rotary part are fitted together in the direction of the power take-off axis of rotation of the manipulator. In the prior-art arrangement of the ring channels, this has the disadvantage that the seals between the ring channels may be damaged during the assembly. Due to the circumferential arrangement of the ring channels, the sealing depends exclusively on the quality of the seals arranged between the ring channels and their expansion volume. There is no possibility of retightening seals damaged during the assembly or even of compensating tolerance errors.

FR-A-2 596 495 shows a rotary and drive connection for the arm parts of a robot. Hydraulic rotary cylinders are provided for driving the arm parts which are rotatable in relation to one another. The rotary cylinder fastened to the rotated arm part is supplied by an external hydraulic pump via a rotary connection, which is arranged between the arm parts. The rotary connection forms a fixed part of the robot, and the two parts of the rotary connection are rigidly connected to one arm part each. The rotary connection has cross channels and ring channels arranged concentrically around the axis of rotation.

Another tool change device for manipulators has been known from EP-B10 164 091, but this has no rotary connection for the fluidic supply lines. The needed freedom of movement of the tool is achieved here due to the flexibility of the connected supply lines.

SUMMARY AND OBJECTS OF THE INVENTION

The object of the present invention is to show a tool change device for manipulators with a rotary connection, which has a higher reliability of assembly and operation.

According to the invention, a tool change device for manipulators is provided with a rotary connection for fluidic supply lines of the tool. The rotary connection has a .fixed part and a rotary part with ring channels and cross channels. The contact plane of the rotary connection is directed at right angles to the power take-off axis of rotation of the manipulator. The ring channels are arranged in concentric circles around the power take-off axis of rotation. The fixed part and the rotary part have flat contact surfaces wherein the contact surfaces are held together in a housing of a manipulator-side coupling part along the power take-off axis of rotation in an adjustable tensioning connection.

The design of the rotary part according to the present invention has the advantage that the seals can no longer be damaged during the assembly and their function during the operation is therefore compromised less. In addition, the rotary connection according to the present invention is less susceptible to tolerance. It has a better accuracy of fit and tightness. On the whole, there is a high reliability of operation and yet a shorter overall length. This is of great significance in light of heavy tools and high supporting moments.

The design of the rotary connection according to the present invention also makes it possible to hold together the fixed part and the rotary part in an adjustable tensioning locking and, as a result, possibly to adjust the pressing force and the pressing path of the seals. It is advantageous for this purpose to mount the rotary connection, which has the shape of a flat plate, in a housing surrounding it in the manner of tongs. The tensioning locking can be adjusted accurately and in a simple manner via the mounting and by adjusting the housing parts. It is advantageous to arrange a support element between the fixed part and the rotary part to absorb tilting forces and to reduce the sliding friction under normal load.

The housing preferably has two housing parts, which surround the rotary connection in the manner of tongs. The housing parts are preferably connected to one another by a screw connection and a spacer. The housing parts preferably have radially projecting housing flanges on which at least the fixed part is mounted via a radial/thrust bearing. A support element is preferably arranged between the fixed part and the rotary part, adjacent to the seals. The support element is preferably designed as an outer sliding ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
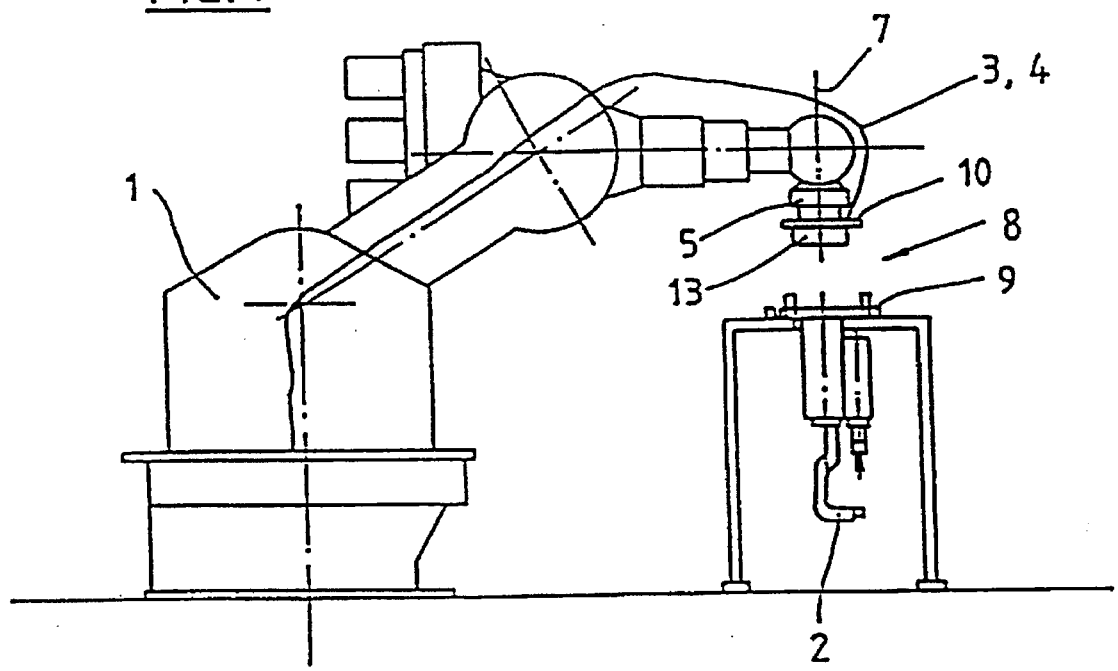
FIG. 1 is a synoptic view of a manipulator with a tool change device and a tool.

FIG. 1 shows a manipulator 1 with a tool change device 8 and a tool 2. The manipulator is designed as a preferably six-axis industrial robot. It has electric and fluidic supply lines 3, 4, which are led from the robot 1 to the tool 2 via the tool change device 8. Cooling water, oil or compressed air for fluidic drives or other liquid or gaseous media are fed to the tool via the fluidic supply lines 3. The tool change device 8 makes it possible for the manipulator 1 to receive different tools 2 and to also establish the supply connection during the mechanical coupling.

The tool change device 8 has a rotary connection 13, with which at least the fluidic supply lines 3, and optionally also the electric supply lines 4, can be connected to the tool 2 in a rotary manner at the time of the coupling. The rotary connection 13 comprises a manipulator-side fixed part 14 and a rotary part 15 associated with the tool side, which is rotatable in relation to the fixed part.

At its front end, the manipulator 1 has a hand 5 with a hand flange 6 rotatable around the power take-off axis of rotation 7. A moment support 17, on which the fixed part 14 of the rotary connection 13 is supported, projects from the housing of the hand 5.

Aside from the rotary connection 13, the tool change device 8 has a design similar to that of the coupling construction known from EP-B10 164 091. The coupling part 9 connected to the tool 2 and the manipulator-side coupling part 10 are fitted together axially in the direction of the power take-off axis of rotation 7 during the coupling. The mutual rotation position during coupling is exactly aligned by means of a centering device 11 provided with indexes. A clamping device 12, rotatably driven by the hand flange 6, subsequently comes into action, bringing the two coupling parts 9, 10 axially closer together along the axis 7 via a bayonet guide and mutually locking them. The coupling parts 9, 10 as well as the clamping device 12 and the centering device 11 may have different designs as needed.

Figure 2:
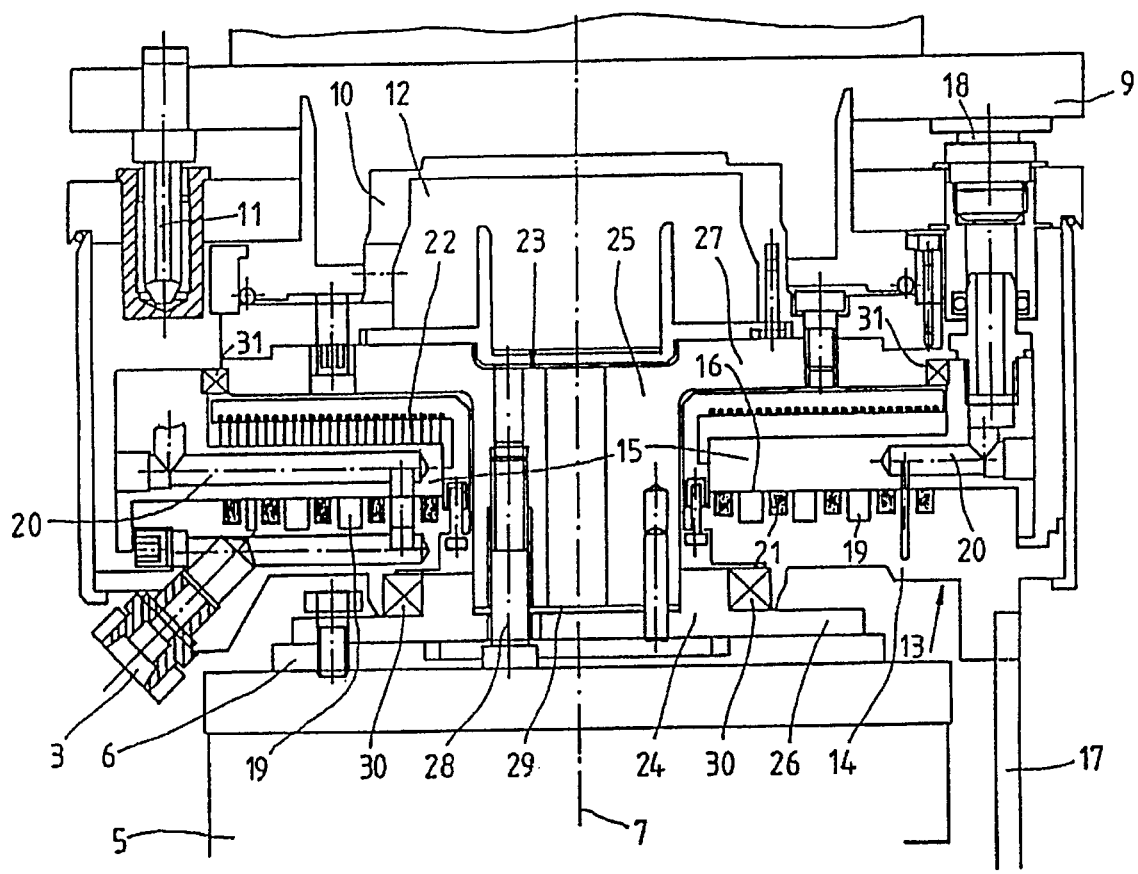
FIG. 2 is an enlarged cutaway view of a cross section through the tool change device and the rotary connection.

Plug-type connections 18 for the fluidic supply lines 3 and optionally also for the electric supply lines 4 (not shown in FIG. 2) are also connected at the time of the mutual engagement of the coupling parts 9, 10. The line sections coming from the rotary part 15 of the rotary connection 13 are coupled with the line sections continuing on the tool 2 via the plug-type connections 18. In the exemplary embodiment shown, the plug-type connections 18 comprise plugs on the tool-side coupling part 9, which are introduced into fitting jacks on the rotary connection 13. The arrangement may also be reversed. Some of the plug-type connections 18 may also be obturated on the rotary connection 13 if some lines are not needed on the tool side. As is shown in FIG. 2, a plurality of plug-type connections 18 are arranged on the rotary connection 13, distributed around the axis 7.

The fixed part 14 and the rotary part 15 of the rotary connection 13 are designed as ring disks guided rotatably against each other. The fixed part 14 and the rotary part 15 touch each other in a contact plane 16, which is directed at right angles to the power take-off axis 7 of the manipulator 1 or of the hand flange 6. The fixed part 14 has a plurality of ring channels 19 with elastic seals 21 located between them, which are arranged in concentric circles around the power take-off axis of rotation 7.

The seals 21 consist of a suitable sealing material and a suitable expanding agent located under it in the groove, e.g., a compressed O-ring, a pressure pad or the like, which presses the sealing material upward and compensates for the wear. The seals 21 project slightly above the ring disk surface of the fixed part 14. The rotary part 15 lies on the seals 21, and there is a small gap from the surface of the ring disk of the fixed part 14.

The ring channels 19 are open toward the contact plane 16 and correspond to a corresponding cross channel 20 in the rotary part 15. The cross channels 20 lead to a plug-type connection 18 each. The ring channels 19 are connected to a fluidic supply line 3 each led to them on the manipulator side.

The tool 2 with the hand flange 6 can be rotated as desired due to the rotary connection 13, and the fluidic media supplied are transmitted to the tool 2 via the ring channels 19 and the cross channels 20. The fixed part 14 is held on the hand 5 via the moment supports 17. The rotary part 15 is connected to the housing 23 and the tool 2 via the coupling parts 9, 10 and the centering device 11. It may be rotated with the tool around the axis 7 as desired.

As is shown in FIG. 2, the rotary connection 13 may also have sliding contacts 22 for the rotary transmission of electric supply lines 4. Control voltages are transmitted in the exemplary embodiment shown. In addition, higher voltages and currents for the tool, e.g., welding currents or the like, may also be transmitted via the rotary connection 13 with corresponding fixed and rotary parts.

The disk-shaped and compact rotary connection 13 is mounted in a housing 23 by means of radial/thrust bearings 30, 31, e.g., in the form of rolling bearings. The bearing 30 is preferably designed as a thrust bearing with a conical roller or cone ring. The housing 23 comprises a lower housing part 24 screwed together with the hand flange 6 and an upper housing part 25. Both housing parts 24, 25 have annular housing flanges 26, 27 radially projecting toward the axis 7, with which they surround the rotary connection 13 in the manner of tongs. The radial/thrust bearings 30, 31 are also arranged on the housing flanges 26, 27. The housing parts 24, 25 are inserted into each other along the axis 7 and are screwed together 28 after a ground spacer 29 has been placed between them. The radial/thrust bearings 30, 31 and consequently the tensioning connection between the fixed part 14 and the rotary part 15 are set via the screw connection 28 and the spacer 29. The distance between the housing flanges 26, 27 and consequently the tensioning connection between the fixed and rotary parts 14, 15 can be changed by replacing the spacer 29. The pressing force and the height of the seals 21 or the distance between the ring disk surfaces of the rotary and fixed parts 14, 15 can thus be influenced as needed.

The housing 23 is fastened to the manipulator-side hand flange 6 and is connected on the other side to the clamping device 12 in the coupling part 10. After the coupling parts 9, 10 have been fitted together axially, the hand flange 6 rotates by a certain amount during the coupling of the tool 2, and the clamping device 12 is actuated via the rotation, and it pulls the coupling parts 9, 10 together. The radial/thrust bearings 30, 31 now make possible the tensioning rotation of the housing 23 in relation to the already coupled plug-type connection 18, the fixed part 14 and the rotary part 15. The fixed part 14, the rotary part 15, and the coupling part 9 do not participate in the rotation.

Figure 3:
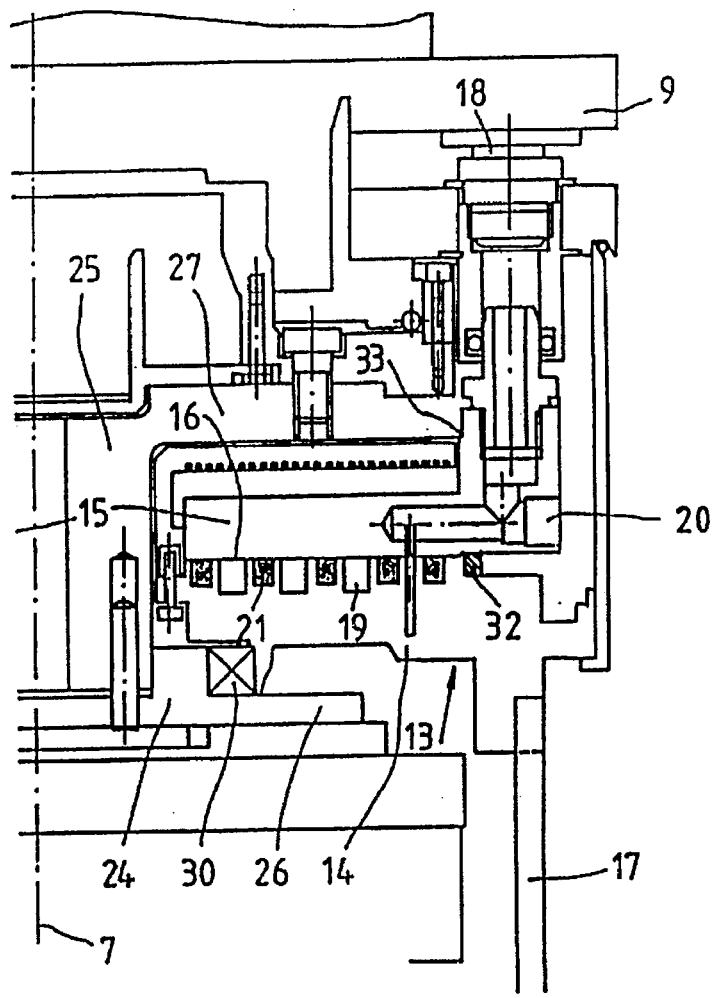
FIG. 3 is a variant of FIG. 2 as a half section with a support element between the fixed part and the rotary part.

FIG. 3 shows a variant. A support element 32, which is preferably designed as a sliding ring made of a plastic or another suitable material, is arranged between the fixed and rotary parts 14, 15 in the area of the contact plane 16. This sliding ring is laid on the outside around the ring channels 19 and the seals 21. The support element 32 lies, guided on a shoulder, on the fixed part 14 and is located at a short distance from the rotary part 15. It absorbs the tilting forces and tilting moments which may occur during the operation under load by supporting the rotary part 15 which starts to rotate during tilting. The support element 32 ensures the above-mentioned distance between the fixed and rotary parts 14, 15 and prevents the seals 21 from being overloaded. In addition, the sliding friction is reduced under normal load.

In addition, the rolling bearing is abandoned in the exemplary embodiment according to FIG. 3. An axial and radial guide 33 in the form of a stepped shoulder is provided, instead, between the housing flange 27 and the rotary part 15. The tensioning connection between the fixed and rotary parts 14, 15 can be set in the same manner as in the exemplary embodiment according to FIG. 2.

While specific embodiments of the invention have been shown and described in detail to illustrate the application of the principles of the invention, it will be understood that the invention may be embodied otherwise without departing from such principles.

I claim:

1. A tool change device for robotic manipulators, comprising:

a rotary connection for fluidic supply lines of the tool, the rotary connection including a fixed part and a rotary part;

one of said fixed part and said rotary part including ring channels connected to cross channels of said fixed part and said rotary part, said fixed part and said rotary part defining a contact plane directed at right angles to a power take-off axis of rotation of said manipulator, said ring channels being arranged in concentric circles around said power take-off axis of rotation, said fixed part and said rotary part having flat surfaces in contact at said contact plane;

a housing of said manipulator-side coupling part, said fixed part and said rotary part being disposed in said housing, said housing defining an adjustable tensioning connection with said rotary part and said fixed part disposed therein, for holding said fixed part and said rotary part together along said power take-off axis of rotation.

2. A tool change device according to claim 1, wherein said housing includes two housing parts which surround said rotary connection in a tong-like manner.

3. A tool change device according to claim 1, further comprising a screw connection and a spacer holding said housing parts connected to one another.

4. A tool change device according to claim 1, further comprising a radial thrust bearing, said housing parts including radially projecting housing flanges, said fixed part being mounted on said housing flanges via said radial thrust bearing.

5. A tool change device according to claim 1, further comprising a support element arranged between said fixed part and said rotary part and a seal disposed adjacent to said support element.

6. A tool change device according to claim 5, wherein said support element is formed as an outer sliding ring.

* * * * *